United States Patent [19]

Bahr, deceased et al.

[11] Patent Number: 5,076,379

[45] Date of Patent: Dec. 31, 1991

[54] MECHANISM FOR TRANSLATION OF LINEAR MOTION TO ROTARY MOTION

[76] Inventors: William T. Bahr, deceased, late of Wallingford; by Mary F. Bahr, executrix, 23 Beaumont Ave., Wallingford, both of Conn. 06492

[21] Appl. No.: 615,231

[22] Filed: Nov. 19, 1990

[51] Int. Cl.[5] .......................... B60S 9/00; F01B 9/00; F16H 29/20
[52] U.S. Cl. ........................ 180/16; 280/757; 92/136; 92/130 R; 188/4 B; 74/89.17
[58] Field of Search ............... 180/16; 280/757; 92/136, 130 R; 188/4 B; 74/89.17; 267/113, 118, 124; 254/419

[56] References Cited

U.S. PATENT DOCUMENTS

| | | |
|---|---|---|
| 1,234,560 | 7/1917 | Palmer . |
| 2,844,128 | 7/1958 | Steiner . |
| 3,129,046 | 4/1964 | Morris . |
| 3,179,015 | 4/1965 | Kurt . |
| 3,460,346 | 8/1969 | Branson . |
| 3,494,205 | 2/1970 | Heese .................. 74/89.17 |
| 3,543,679 | 12/1970 | Wahl . |
| 3,556,017 | 1/1971 | Floehr .................. 267/113 |
| 4,019,220 | 4/1977 | Lieberman . |
| 4,167,897 | 9/1979 | Bunyard . |
| 4,170,169 | 10/1979 | Shafer .................. 92/130 R |
| 4,657,118 | 4/1987 | Anderson . |
| 4,792,128 | 12/1988 | Holley .................. 267/118 |
| 4,809,797 | 3/1989 | Guyot . |
| 4,840,399 | 6/1989 | Rieger et al. . |
| 4,872,359 | 10/1989 | Schulz et al. . |
| 4,901,809 | 2/1990 | Tschannen . |

*Primary Examiner*—Charles A. Marmor
*Assistant Examiner*—Paul Dickson
*Attorney, Agent, or Firm*—Robert H. Montgomery

[57] ABSTRACT

A device for translating linear to rotary motion comprising a housing member, a rack member disposed in the housing member for longitudinal movement therein and having a starting position, a shaft in the housing having a pinion thereon engaged by the rack, the shaft being journalled in the housing and being disposed generally perpendicular to movement of the rack member, the shaft extends outwardly of the housing and has a rotative driving member thereon, the rack member has a longitudinal opening therein at one end thereof receiving the cylinder of gas cylinder-piston assembly, the piston of the gas cylinder piston assembly engages an end wall of the housing whereby upon movement of the rack member the gas in the cylinder is compressed and energy is stored therein, a slave cylinder in the housing member is adapted to receive fluid under pressure from an external source, a floating piston in the slave cylinder is arranged to act upon and linearly drive the rack and thereby rotate the pinion, the shaft and the driving member whereby the gas in the cylinder is compressed and energy is stored therein, and the gas in the cylinder provides a return force on the rack member upon cessation of fluid pressure in the slave cylinder and upon the floating piston, the cylinder-piston assembly will return the rack member to its starting position, and the rack member rotates the pinion back to its starting position.

20 Claims, 4 Drawing Sheets

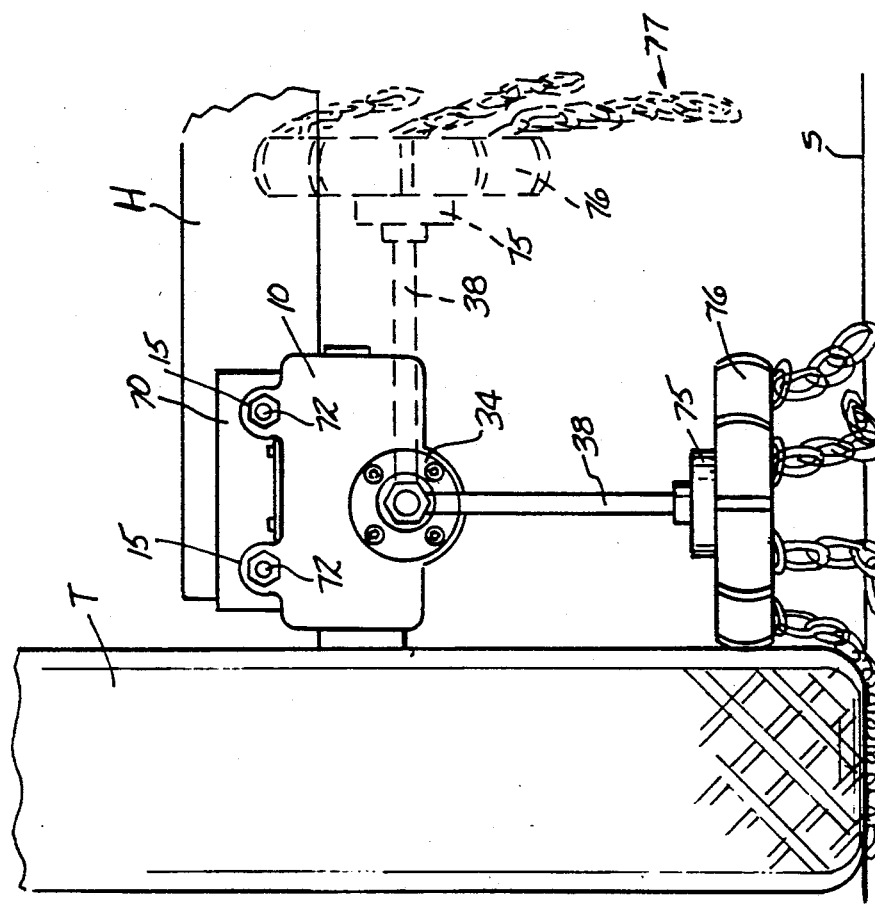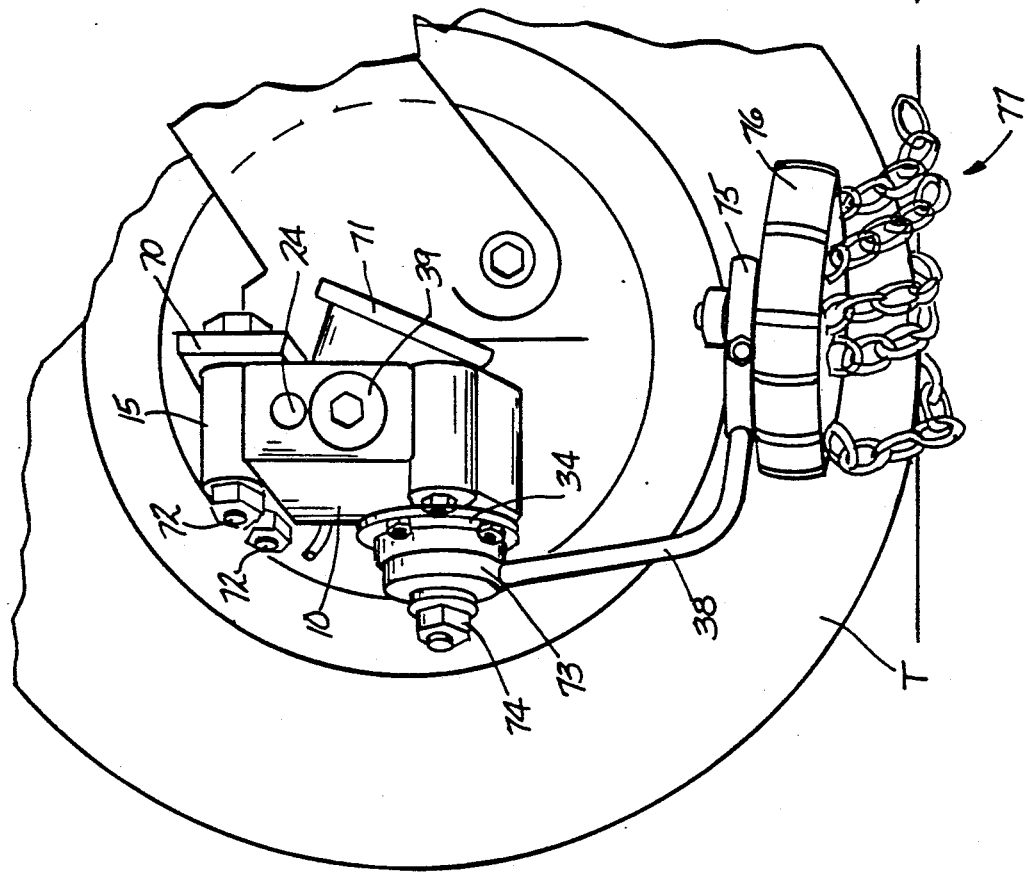

MECHANISM FOR TRANSLATION OF LINEAR MOTION TO ROTARY MOTION

FIELD OF THE INVENTION

This invention relates to devices for translating linear motion to rotary motion and is particularly adapted to be placed in areas of limited dimension such as beneath a motor vehicle so as to move a rotary chain assembly from an inoperative stored position to an operative position to position rotary chains beneath the drive wheels of a motor vehicle.

BACKGROUND OF THE INVENTION

There are many devices known in which a rack is moved in a linear direction to engage a pinion which imparts rotary movement to a shaft.

One such application of these linear to rotary movement translators is in the use of positioning a multiplicity of snow chains which are regularly spaced on a rotative wheel such that the wheel and chains will be moved so that the chains will be disposed under the drive wheels of a vehicle when in an operative position upon rotation of the pinion in one direction and will be withdrawn from an operative position upon rotation of the pinion in another direction.

Examples of such mechanisms are set forth in U.S. Pat. Nos. 4,657,118; 4,809,797; 4,872,359; 4,840,399 and 4,901,809.

The foregoing patents generally disclose a shaft or a drive shaft which is pivotal with a longitudinally displacable rack with a pinion with a pivot arm connected to an output drive shaft which will rotate an arm for a wheel of a centrivical chain assembly.

Numerous known anti-skid devices or centrivical chain wheels for motor vehicles are known. Such devices form a winter travel safeguard which can be engaged when needed by the driver of a motor vehicle and which substantially improve traction between the drive wheels and the roadway.

Generally, such centrivical wheel chain assemblys comprise a plurality of chains which are radially spaced apart and depend from a rotatable disk or wheel device. Such chains are usually six in number and equi-angularly spaced around the wheel or disk at one end thereof. The wheels or disks when lowered into an operative position will be disposed beneath the drive wheels of a vehicle and will rotate with the drive wheel while providing one or more chains below the wheel.

In the devices disclosed in these patents, the actuating mechanism for the chain carrying wheels are rather large and cumbersome, and in some cases may be difficult to mount because of the restricted space adjacent the axles of the driving wheels of the vehicles.

Additionally, these known devices are, in some cases, rather complex in mechanical structure and require a large number of machined parts.

Accordingly, the present invention provides a new and improved linear motion to rotative motion translator which is quite compact in size and in dimension and which in the environment described is easily installed in a motor vehicle.

An object of this invention is to provide a new and improved motion translating device of very compact structure.

Another object of this invention is to provide a new and improved linear to rotary motion translating device which requires no external devices.

A further object of this invention is to provide a new and improved actuating mechanism for operation of a multiplicity of chains beneath the drive wheels of a vehicle.

SUMMARY OF THE INVENTION

Briefly stated, the invention in one form thereof comprises a device for translating linear to rotary motion comprising a housing member, a rack member disposed in the housing member for longitudinal movement therein and having a starting position, a shaft in the housing having a pinion thereon engaged by the rack, the shaft being journalled in the housing and being disposed generally perpendicular to movement of the rack member, the shaft extends outwardly of said housing and has a rotative driving member thereon, the rack member has a longitudinal opening therein at one end thereof receiving the cylinder of a gas cylinder-piston assembly, the piston of the gas cylinder-piston assembly engages an end wall of said housing whereby upon movement of the rack member the gas in the cylinder is compressed and energy is stored therein. A slave cylinder is in the housing member and is adapted to receive fluid under pressure from an external source. A floating piston in the slave cylinder is arranged to act upon and linearly drive the rack and thereby rotate the pinion, the shaft and the driving member whereby the rack member rotates the pinion, and compresses the gas in the cylinder to provide a return force on the rack member. Upon cessation of fluid pressure in the slave cylinder and upon the floating piston, the cylinder-piston assembly will return the rack member to its starting position, and the rack member rotates the pinion back to its starting position.

A device embodying the invention is particularly adaptable for translating linear motion to rotary motion while only occupying a small amount of space and is quite adaptable to being mounted on a vehicle to the axis thereof to move rotary snow chains between operative and inoperative positions with respect to the driving wheels of a motor vehicle.

The features of the invention, which are believed to be novel, are particularly pointed out and distinctly claimed in the concluding portion of this specification, however, the invention together with further objects and advantages thereof, may best be appreciated by reference to the following detailed description taken in conjunction with the drawings.

BRIEF DESCRIPTION OF THE DRAWINGS

FIG. 3 is an illustration of the inside of a driving wheel of a vehicle showing a mechanism embodying the invention mounted to the vehicle;

FIG. 4 is a view seen from the rear of the vehicle portion of FIG. 3 showing a mechanism embodying the invention.

DETAILED DESCRIPTION OF PREFERRED EMBODIMENTS OF THE INVENTION

Figure 1:
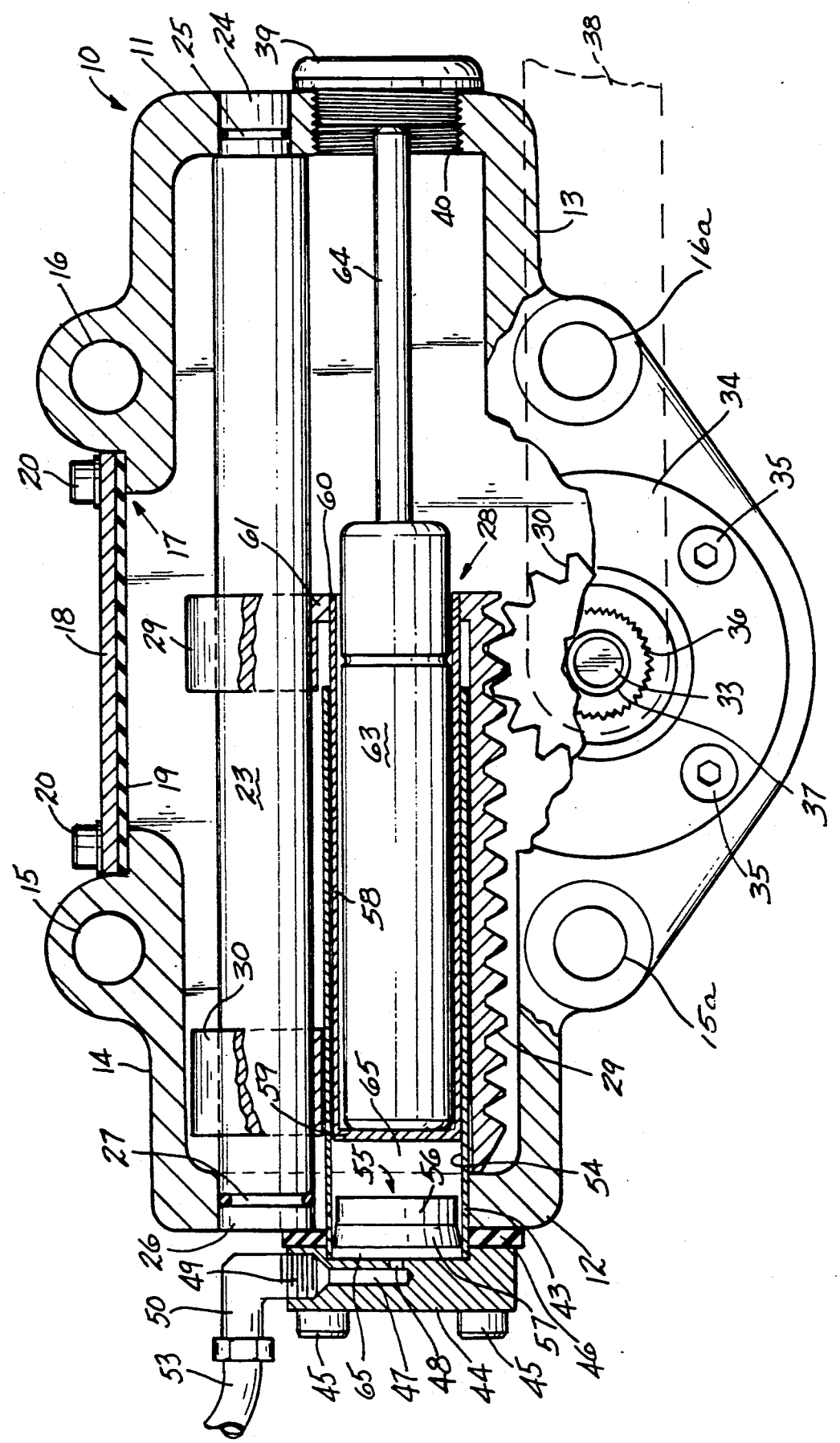
FIG. 1 is a longitudinal elevation of a member embodying the invention which is partially cut away to show other parts in section.

Referring now to FIG. 1, the invention comprises a housing member 10 defined by an end wall 11 and opposite end wall 12, bottom wall 13, and a top wall 14. Top wall 14 has defined thereon attachment lugs 15 and 16.

An opening 17 is defined in top wall 14 and receives a cover member 18 together with a seal 19. The cover member 18 is affixed to top wall 14 as by means of a plurality of bolts or screws 20 or any other suitable fastening devices. The purpose of opening 17 is to permit assembly of the interior portions of the device, within housing.

Disposed within housing 10 is a guide shaft 23 having an end 24 tightly engaging an opening in end wall 11 and which may receive a seal 25 thereabout. At the other end therein, guide member 23 has an end 26 received in a mating opening in end wall 12 and has a seal 27 thereabout. A rack member 28 is disposed within housing 10. Rack member 28 may be a casting which includes upstanding arms 29 and 30 extending therefrom with circular openings therein and receiving guide shaft 23 therein. Rack member 28 has a rack 29 defined on the underside thereof as shown in FIG. 1. Rack 29 meshes with a pinion 30 which is on a shaft 33. Shaft 33 is journalled in a housing member 34 which is affixed to housing 10 by means of a plurality of bolts 35 (only two shown). Mounted on the exterior of member 34 on shaft 33 is a spline 36 having a threaded stud 37 extending outwardly therefrom for attachment to an arm member 38 shown only in dotted line in FIG. 1.

Housing 10 is closed at one end (right hand side) by a cap or closure member 39 threaded into an opening 40 in end wall 11.

An opening 43 is defined in end wall 12 and is enclosed by a fitting 44 affixed to end wall 12 by means of plurality of bolts 45 or other suitable fastening devices. Fitting 44 is tightened against end wall 12 and a seal 46 is provided between fitting 44 and end wall 12. Fitting 44 has a passage 47 therein leading to an opening 48 which communicates with the interior of housing 10 which is hereinafter described. Fitting 44 further receives a connection 49 from a fluid line which may be from a fluid line fitting 50 and hydraulic line 53. The actuating fluid in line 53 is preferably hydraulic.

Attached to end wall 12 and fitting 44 is a cylinder 54 which may be referred to as a slave cylinder. Disposed within slave cylinder is a piston 55 which may comprise a metallic disc 56 having a sealing element 57 attached thereto which may be a leather disc which makes sealing contact with the interior of slave cylinder 54.

Disposed within slave cylinder 54 is a closed end cylinder 58 having an end wall 59. The open end 60 of cylinder 59 is secured as by welding to end 61 of rack member 28 and accordingly is adapted upon movement to drive rack member 28.

Disposed within cylinder 58 is a gas cylinder-piston assembly 60 having a cylinder 63 with the shaft 64 of a piston extending therefrom. Shaft 64 bears on end cap 39. Alternatively, the cylinder piston assembly may be reversed.

Figure 2:
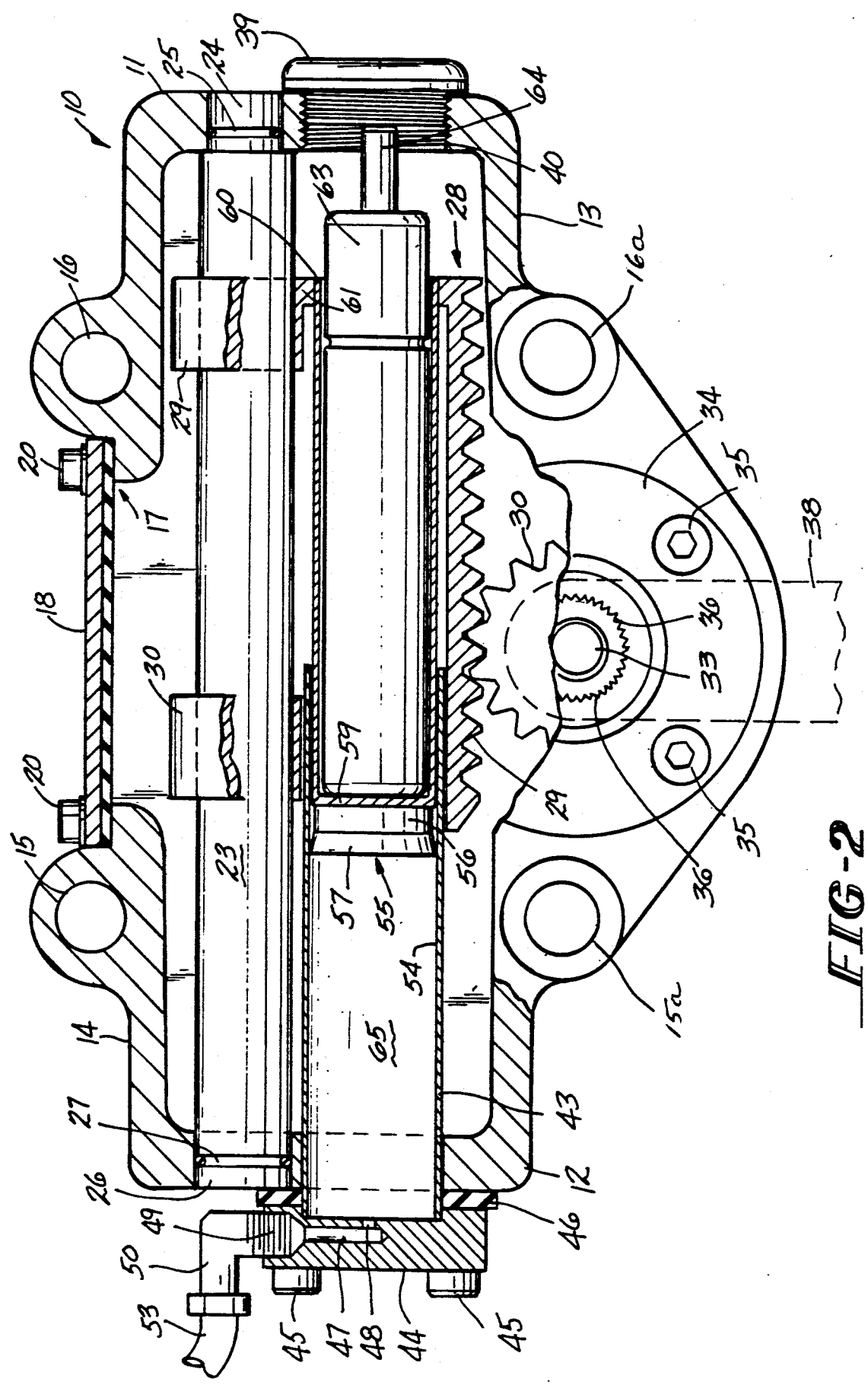
FIG. 2 is a view similar to FIG. 1 but showing the device of FIG. 1 in another operative position.

Reference is now made to FIG. 2 taken in conjunction with FIG. 1. As hydraulic fluid is applied through line 53 coupling 49 and port 47 to volume 65 as designated in FIG. 1, piston 55 will drive rack member 28 to the right from the position shown in FIG. 1 carrying cylinder 63 therewith resulting in compression of the gas in cylinder 63 by virtue of the piston in cylinder 63 being driven therein. This may be exemplified by the small dimension of shaft 64 extending from piston 63 with its end bearing against cap 39. Thus, energy is stored in cylinder 63 due to the compression of the gas therein. As the rack member 28 moves to the right as shown in FIG. 2, it rotates pinion 30 together with shaft 33 thereof causing rotation of spline 36 and results in the rotation of arm 38 clockwise as shown between FIG. 1 and FIG. 2. So long as the hydraulic pressure is applied to volume 65, the arm 38 will be held in the position shown in FIG. 2.

However, upon removal of the hydraulic pressure in line 53 the energy stored in cylinder 63 will return the rack member 28 to the left as shown in FIG. 1 resulting in the rotation of arm 38 back to the position shown in FIG. 1.

A device embodying the invention is particularly adaptable for translating linear motion to rotary motion while only occupying a small amount of space and is quite adaptable to being mounted on a vehicle or the axle housing thereof to move rotary snow or traction chains between operative and inoperative positions with respect to the driving wheels of a motor vehicle.

FIG. 3 exemplifies a view from the inside of a traction tire of a vehicle and shows housing 10 mounted to a bracket 70 which is in turn mounted to a bracket 71 affixed to the axle housing of the vehicle. The mounting to bracket 70 is by means of bolts 72 extending through the lugs 15 and 16 on housing 10. Alternatively, the housing 10 may be mounted by bolts extending through legs 15a and 16a on the lower portion of housing 10 as shown in FIGS. 1 and 2.

As shown the arm 38 has an adaptor member 73 received on spline 36 and the adaptor member 73 is secured on threaded shaft 37 by means of a nut 74. Thus, the arm 38 will be rotational on shaft 37 and spline 36 as will hereinafter be more fully exemplified.

The free end of arm 39 carries a support member 75 which has rotatably mounted thereto an element referred to as a chain wheel 76 which will engage the inside of tire T in an operative position. Thus, upon rotation, tire T will rotate chain wheel 76. Chain wheel 76 has depending therefrom a plurality of chains indicated by the reference numeral 77, which are annulary radially disposed with respect to chain wheel 76 and which will extend under the bottom of tire 7 as more fully exemplified in FIG. 4.

In both FIGS. 3 and 4 the arm 38 is shown in full line the down or operative position as exemplified in FIG. 2.

FIG. 4 is a view generally perpendicular than that shown in FIG. 3 and shows at least one chain beneath the tire T and a road surface S. FIG. 4 also exemplifies the axle housing H to which the unit may be hung by means of the brackets 70 and 71. It is preferred that the arm 38 be so formed with respect to the mounting of the housing unit that the vertical axis of the chain wheel 76 perpendicularly intersects the axis of the axle of the vehicle.

FIG. 4 also shows in broken outline the storage or inoperative position of chain wheel 76 when the mechanism is in the position shown in FIG. 1. In these positions, the chains 77 are not in an operative position from the standpoint of increasing the traction of the tire T on the road surface S.

A device embodying the invention is quite compact and may easily be fitted to the axle or any other support bracket on a motor vehicle in operative position with respect to the traction wheels and may be rotated between an operative and an inoperative position by the mechanism described.

Figure 5:
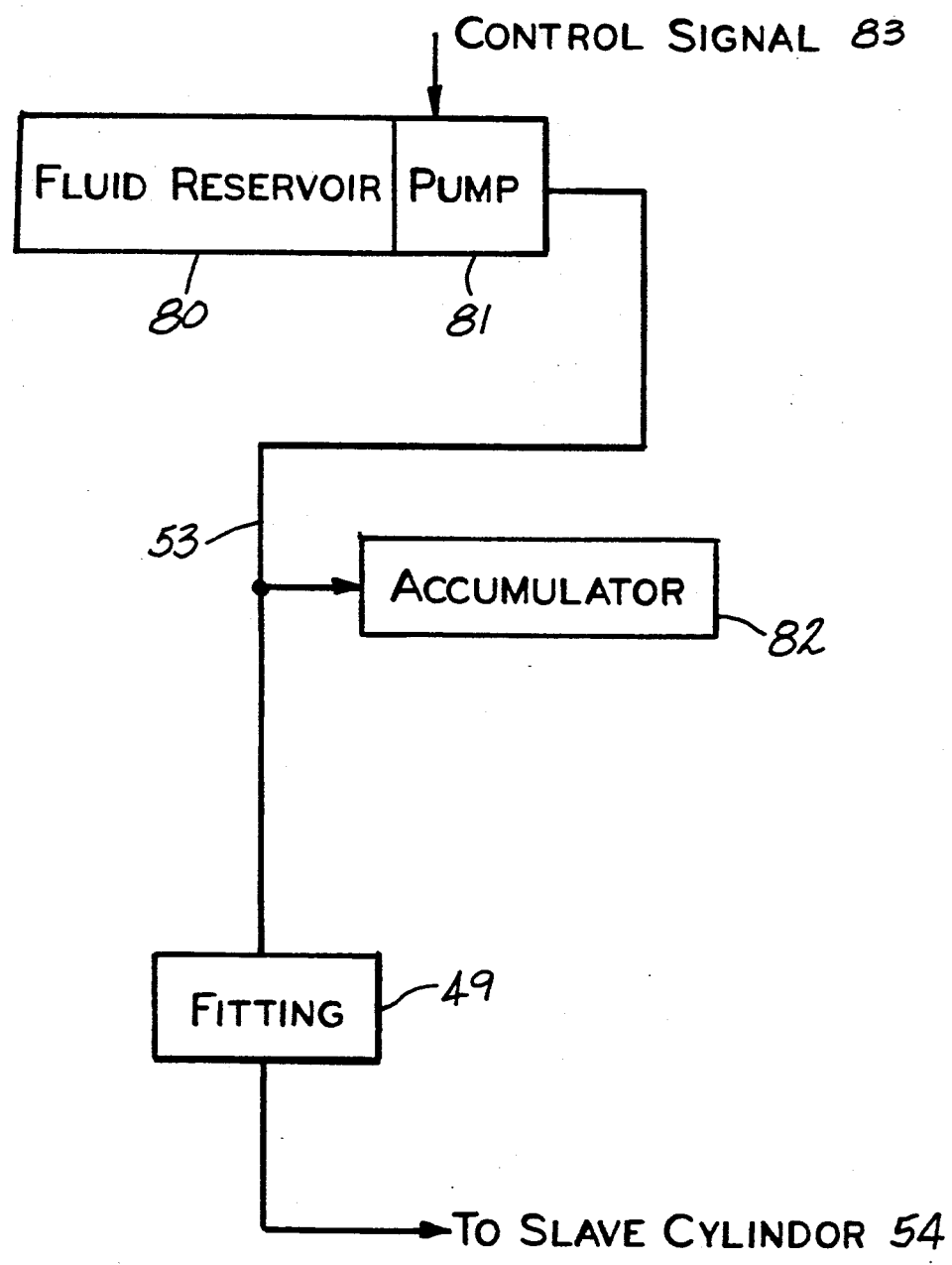
FIG. 5 is a block diagram exemplifying a fluid system used in actuating the mechanism of FIGS. 1-4.

Reference is now made to FIG. 5 which schematically indicates a fluid system, either hydraulic or pneumatic for actuating the mechanism of FIGS. 1 and 2. As shown, the system is hydraulic. The vehicle will include a fluid reservoir 80 either pneumatic or hydraulic together with a pump 81 which will supply fluid pressure over line 53 to the fitting 49 to rotate the arm 38 from an inoperative to an operative position. A control device such as a switch is indicated by control signal arrow 83 at pump 81.

An accumulator 82 is connected to line 53 and will maintain the pressure thereon so long as pump 81 is operating. When the pump 81 is turned on the drive cylinder 59 under the influence of floating piston 55 will move the rack 28 from the position shown in FIG. 1 to the position shown in FIG. 2 and the arm 38 will be rotated downwardly as exemplified by the full line position in FIG. 4 and the chains 77 will be positioned to be disposed beneath the tire T with the chain wheel 76 in contact with the tire T. Thus, as the tire T rotates it will rotate chain wheel 76 and the various chains 77 will rotate beneath tire T providing increased traction between the tire T and a road surface S. At the same time, the piston 64 from piston cylinder assembly 60 will be driven into the cylinder and act as a return spring. When the pump is turned off the cylinder piston assembly will rotate arm 38 back to the position shown in the dotted line in FIG. 4.

With the present system the actuating mechanism is wholly self contained and requires no external drive parts and accordingly requires very little space beneath a motor vehicle adjacent to the drive wheels.

While a separate guide member 23 for rack member 28 is shown in the drawings, this guide member could be dispensed with and different guide means provided. For example, the housing could be made in two parts with grooves in either part which receive flyers extending from either side of the rack member. Alternatively, end wall 11 may be made separate to permit insertion of each member 28. Many various linear guiding devices may be provided for rack member 28.

Accordingly, It may thus be seen that the objects of the invention set forth, as well as those made apparent from the foregoing description, are efficiently attained. While preferred embodiments of the invention has been set forth for purposes of disclosure, modifications to the disclosed embodiments of the invention, as well as other embodiments thereof, may occur to those skilled in the art. Accordingly, the appended claims are intended to cover all embodiments which do not depart from the spirit and scope of the invention.

What is claimed is:

1. A device for transmitting linear to rotary motion comprising a housing member, a rack member disposed in said housing for longitudinal movement therein and having a starting position,
    a shaft in said housing having a pinion thereon engaged by said rack, means on said housing journalling said shaft therein, said shaft being disposed generally perpendicular to movement of said rack member,
    said shaft extending outwardly of said housing and having a rotative driving member thereon,
    said rack member having a longitudinal opening therein at one end thereof receiving the cylinder of a gas cylinder-piston assembly, one of the piston and cylinder of said gas cylinder-piston assembly engaging an end wall of said housing whereby upon movement of said rack member the gas in said cylinder is compressed and energy is stored therein,
    a slave cylinder in said housing adapted to receive fluid under pressure,
    a floating piston, in said slave cylinder arranged to act upon and drive said rack member at the end thereof opposite said cylinder piston assembly, whereby when said rack member is driven by said floating piston said rack member rotates said pinion, said shaft and said driving member and compresses the gas in said cylinder to provide a return force on said rack member, and
    whereby upon cessation of fluid pressure in said slave cylinder and upon said floating piston, said cylinder-piston assembly will return said rack member to its starting position.

2. The apparatus of claim 1 further including a linear guide member in said housing, and means on said rack member guidably engaging said guide member so as to insure only linear movement of said rack member in said housing.

3. The apparatus of claim 1 further including means within said housing for guiding said rack member in a linear path.

4. The apparatus of claim 1 wherein said shaft having a pinion thereon is carried by a second housing affixed to said housing.

5. The device of claim 1 further including a second cylinder within and affixed to said rack member and having a closed end acted upon by said floating piston in said slave cylinder, said second cylinder receiving said cylinder-piston assembly.

6. The device of claim 5 wherein said cylinder piston assembly acts as a return spring when fluid pressure on said floating piston is relieved.

7. The device of claim 1 further including an arm on said driving member having a free end, the free end of said arm carrying a rotatable chain wheel with a plurality of radially disposed chains thereon.

8. The device of claim 7 wherein said chain wheel is rotatable on the free end of said arm.

9. The device of claim 1 further including a drive cylinder affixed to said rack member and received within said slave cylinder, said drive cylinder having an end wall acted upon by said floating piston to drive said rack member.

10. The device of claim 1 further including cooperating means within said housing and on said rack member for guiding said rack member only in a linear path.

11. The device of claim 1 further including a fitting secured to said housing member and having a passage therein communicating with the interior or said slave cylinder for introduction of fluid pressure therein.

12. An apparatus for positioning an arm carrying at the free end thereof a rotatable chain wheel having a plurality of radially disposed chains extending therefrom adapted to go beneath the drive wheels of an automotive vehicle comprising a housing member arranged to be mounted to an automotive vehicle adjacent a drive axle thereof, said housing containing a rack member disposed therein for linear movement and having a staring position, a shaft in said housing having a pinion thereon engaged by said rack, means in said housing journalling said shaft therein, said shaft being disposed generally perpendicular to movement of said rack member, said shaft extending outwardly of said housing and having a rotative driving member thereon, said rack member having a longitudinal opening therein at one end thereof receiving one of the cylinder and piston of a gas-cylinder piston assembly, one of said cylinder and piston engaging an end wall of said housing whereby upon movement of said rack member the gas in said cylinder is compressed and energy is stored therein, a slave cylinder in said housing adapted to receive fluid under pressure, a floating piston in said slave cylinder arranged to act upon and drive said rack member at the end thereof opposite said cylinder-piston assembly, whereby when said rack member is driven by said floating piston said rack member rotates said pinion, said shaft and said driving member and compresses the gas in said cylinder to provide a return force on said rack member and upon cessation of fluid pressure in said slave cylinder, said cylinder-piston assembly returns said rack member to its starting position, said arm carrying said chain wheel, being rotatable between an inoperative position and an operative position by said rack member wherein said rotatable chain wheel engages a drive wheel and is rotated thereby.

13. A device for transmitting linear to rotary motion comprising a housing member, a rack member disposed in said housing for longitudinal movement therein and having a starting position,
- a shaft in said housing having a pinion thereon engaged by said rack, means on said housing journalling said shaft therein, said shaft being disposed generally perpendicular to movement of said rack member,
- said shaft extending outwardly of said housing and having a rotative driving member thereon,
- said rack member having a longitudinal opening therein at one end thereof receiving the cylinder of a gas cylinder-piston assembly, the piston of said gas cylinder piston assembly engaging an end wall of said housing whereby upon movement of said rack member the gas in said cylinder is compressed and energy is stored therein,
- a slave cylinder in said housing adapted to receive fluid under pressure, a drive cylinder having a back wall received within said slave cylinder and affixed to said rack member,
- a floating piston in said slave cylinder arranged to act upon said drive cylinder back wall and drive said rack member at the end thereof opposite said cylinder piston assembly, said cylinder-piston assembly being received in said drive cylinder,
- whereby when said rack member is driven by said floating piston said rack member rotates said pinion, said shaft and said driving member and compresses the gas in said cylinder to provide a return force on said rack member, and
- whereby upon cessation of fluid pressure in said slave cylinder and upon said floating piston, said cylinder-piston assembly will return said rack member to its starting position.

14. The apparatus of claim 13 further including a linear guide member in said housing, and means on said rack member guidably engaging said guide member so as to insure only linear movement of said rack member in said housing.

15. The apparatus of claim 13 further including means within said housing for guiding said rack member in a linear path.

16. The apparatus of claim 13 wherein said shaft having a pinion thereon is carried by a second housing affixed to said housing.

17. The device of claim 13 wherein said cylinder piston assembly acts as a return spring when fluid pressure on said floating piston is relieved.

18. The device of claim 13 further including an arm on said driving member having a free end, the free end of said arm carrying a rotatable chain wheel with a plurality of radially disposed chains thereon.

19. The device of claim 13 further including cooperating means within said housing and on said rack member for guiding said rack member only in a linear path.

20. The device of claim 13 further including a fitting secured to said housing member and having a passage therein communicating with the interior of said slave cylinder for introduction of fluid pressure therein.

* * * * *